Jan. 11, 1938.                R. LABORDA                2,105,085
                                VEHICLE
                           Filed Feb. 20, 1937
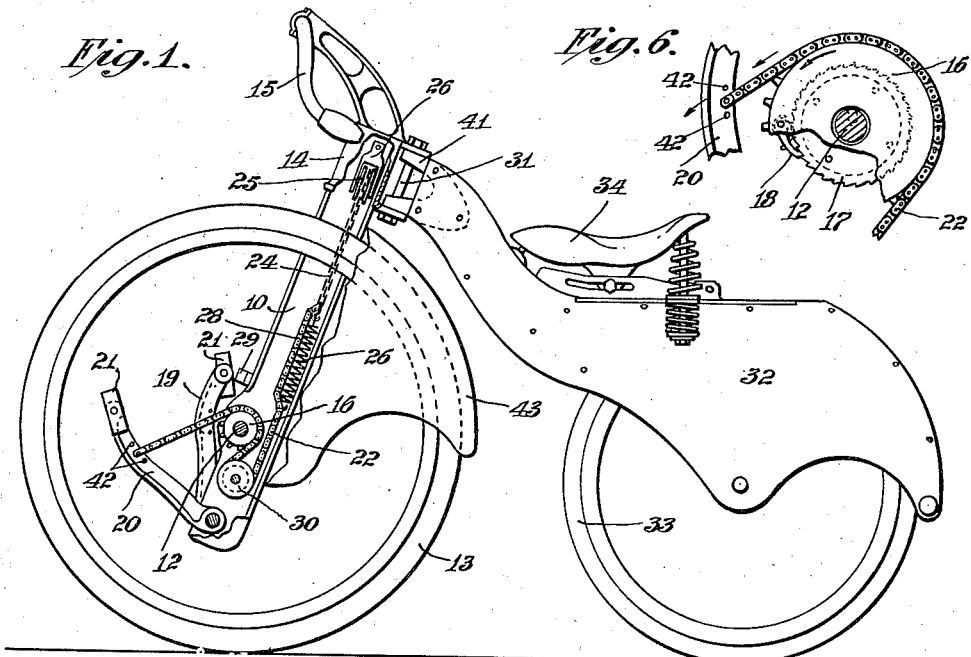
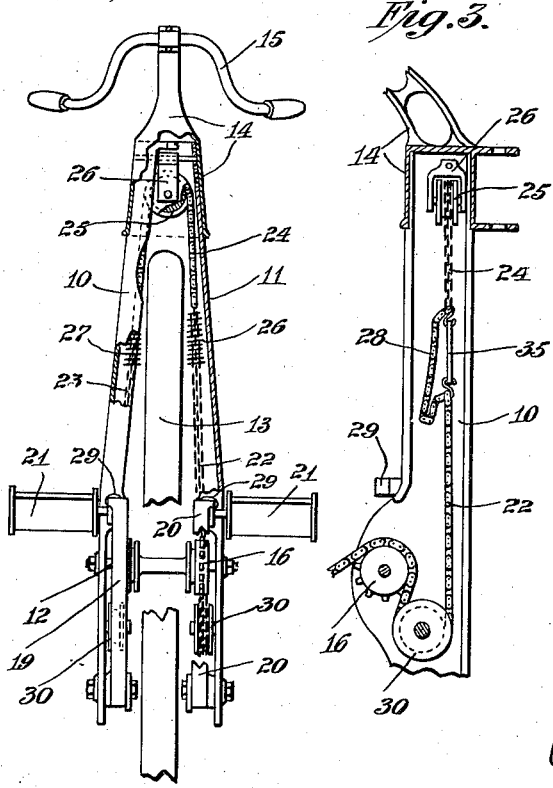

Patented Jan. 11, 1938

2,105,085

UNITED STATES PATENT OFFICE 2,105,085

VEHICLE

Richard Laborda, Brooklyn, N. Y.

Application February 20, 1937, Serial No. 126,747

14 Claims. (Cl. 280—240)

The invention relates to vehicles, and more particularly to a type of vehicle in which power is applied to the driving wheel by means of oscillatory pedals operative upon opposite ends of a flexible driving member co-operating with independently operative one-way clutch mechanisms upon the shaft at opposite sides of the driving wheel.

A vehicle embodying the invention is intended primarily for use by children, and its construction is not only such as to permit it to be economically manufactured, but the propelling mechanism is so constructed that the seat carried by the back frame of the vehicle may be set sufficiently low to permit the feet of the user reaching the ground to permit a rider to readily mount the seat and prevent likelihood of toppling of the vehicle when starting or bringing same to rest.

In a vehicle embodying the invention, all of the working parts of the propelling mechanism are inclosed in the front frame of the vehicle, which front frame has pivotally connected therewith a rear frame in which the rear wheel is mounted, and which carries the seat. In steering the vehicle, this front frame may be turned by means of a handlebar, and by mounting the parts of the propelling mechanism within or upon the frame, these parts are always maintained in a relation to the driving wheel which will permit the free turning of the vehicle without the possibility of disarrangement of parts.

The essential characteristic of the vehicle herein shown and described is the construction of the propelling mechanism by which, when driving power is being applied by either foot lever, there will be a yieldable resistance in the length of the driving chain permitting movement of one foot lever independently of the other, so as to avoid the necessity for synchronizing the movement of the two levers while preventing all possibility of the creation of slack in the flexible connections between said levers.

An elastic member offering such yieldable resistance acts upon the chain at each side of the driving wheel, and the construction and arrangement of parts is such as to limit the degree of flexure of this member so that during the stroke of one foot lever, the other lever will be raised, either by a direct pull from the first lever or by the tension of the elastic members, according to the timing of the movement of the two levers in opposite directions.

While the two foot levers are connected by the driving chain, each lever is permitted movement entirely independently of the other in the same or in opposite directions, the elastic members arranged in the length of said chain ensuring a return movement of one lever entirely independently of the movement of the other lever in the opposite direction. These elastic members will normally hold both levers in the elevated position, the application of power to the driving wheel placing the elastic members at opposite sides of the wheel under tension with each full outward stroke of either lever entirely independently of movement of the other lever.

With this arrangement, the two levers may be moved in opposite directions at different speeds, and the tension of the elastic members, while resisting the power of the driving thrust, will cause the return of the other lever if the pressure thereon be relieved, entirely independently of the movement of the first named lever, and at a relatively higher speed. Both foot levers cannot be depressed to the full extent at the same time, since the maximum flexure of the elastic members is controlled and the run of the chain between the elastic members is limited by this controlling means.

The flexible driving member extends from one foot lever to the other, passing in its course about an idler sheave which is fixed in relation to the front frame, and when either lever is in the raised position, the elastic member at one side of the frame is tensioned during the initial thrust of the lever, causing a relatively slow run of the chain about the sheave, which is permitted solely by the yielding of the elastic member upon the other side of the frame until the controlling member limiting the maximum flexure of said elastic members becomes operative. Whereupon, further run of the chain results in the full flexure of the elastic member upon the other side of the frame, if movement of the other foot lever is resisted. In other words, the quantity of movement of either foot lever during the power stroke is limited by the stoppage of the other lever while in its uppermost position, and a non-elastic connection between the two levers.

By the construction of the propelling mechanism embodied in the invention, a portion of each power stroke, while turning the driving wheel, is resisted by the elastic member, and even though, by reason of the position of the other foot lever during this stroke, a full power stroke is not permitted, nevertheless power can be applied to the driving wheel by one lever so long as the other lever is not in the fully depressed position.

With this arrangement, a smooth easy application of power may be applied to the driving wheel by one foot lever, notwithstanding that the other foot lever may not be moving in the opposite direction at the same speed as the lever through which power is being applied.

With the use of elastic members as described, the portions of the chain co-operating with the sprocket wheels upon the driving wheels, and the portion thereof running over the idler pulley intermediate the two levers will always be kept taut so that there is no danger of these chains overrunning the sprocket wheels or the idler sheave, due to a differential speed of movement in the two foot levers.

The invention consists primarily in a vehicle embodying therein a front frame, a rear frame pivotally connected therewith, a driving wheel mounted in said front frame, a wheel mounted in said rear frame, and means applying power to said driving wheel comprising oscillatory levers mounted in said front frame, a flexible connection having its opposite ends connected with said levers, and expansible and contractible means in the length thereof permitting elongation and shortening of said flexible connection, means limiting the amount of expansion and contraction of said means, guides for said flexible connection carried by said front frame, and one-way clutch mechanisms carried by said front frame, operative upon said driving wheel and actuated by said flexible connection, whereby the portion of said flexible connection between said expansible and contractible means and said lever may impart turning movement to said driving wheel independently of movement of other parts of said flexible connection; and in such other novel features of construction and combination of parts as are hereinafter set forth and described, and more particularly pointed out in the claims hereto appended.

Referring to the drawing,

Fig. 1 is a side view of a vehicle embodying the invention with one of the side plates of the front frame removed and a part of the steering head cap broken away;

Fig. 2 is a front view thereof partly broken away and partly in section;

Fig. 3 is a side view of the front frame with one of the side plates removed and a part of the steering head cap broken away showing a modified form of flexible connection;

Fig. 4 is a detail view showing a fragmentary portion of a different modification of the flexible connection;

Fig. 5 is a view of the upper portion of the front frame partly broken away; and Fig. 6 is a detail view of a one-way clutch mechanism suitable for use in the vehicle of the invention.

Like numerals refer to like parts throughout the several views.

In the embodiment of the invention shown in the drawing, the front frame of the vehicle is shown as being composed of two channel members 10 and 11 which diverge downwardly and are connected by a shaft 12 upon which a driving wheel 13 is rotatably mounted. The upper portions of the sides of said channels have abutting relation to each other, as shown in Fig. 5, and are enclosed by a steering head cap 14 carrying an ordinary handlebar 15.

Mounted upon the shaft 12 is a sprocket wheel 16 forming one member of a one-way clutch mechanism, the other member of which, consisting of a ratchet wheel 17, is carried by the hub of the driving wheel 13. A spring pressed pawl 18 transmits power from the sprocket wheel 16 to the ratchet wheel 17 when said sprocket wheel is turned in one direction, but overrides the teeth of said ratchet wheel upon the stoppage or the reverse rotation of said sprocket wheel. There are two one-way clutch mechanisms of the character described, one operative upon each side of the hub of the wheel 13.

Pivotally mounted adjacent the bottom of each channel member 10—11 are oscillatory foot levers 19 and 20, said levers each being provided with an ordinary foothold 21. Power is applied to the driving wheel by the oscillatory foot levers 19 and 20 through a flexible connection including sprocket chains engaging the sprocket wheels 16 of the clutch mechanisms. These levers are capable of movement, independent one of the other, without regard to exactitude in the timing of their movements.

A flexible connection extends from one of these levers to the other, and the opposite ends thereof are connected with said levers respectively. This flexible connection consists of end sections 22 and 23 of short lengths of sprocket chains co-operating with the sprocket wheels 16 of the one-way clutch mechanism operative upon the driving wheel, and an intermediate section 24 passing over an idler sheave 25 carried by the upper portion of the front frame and mounted in a bearing 26 rigidly supported by said frame.

The opposite ends of the intermediate section 24 of said flexible connections are connected with the end sections 22 and 23 respectively by means of an expansible and contractible mechanism permitting movement of the end sections to a limited extent independently of the intermediate section, means being provided to limit the extent of expansion of said mechanism so that upon the completion of this limited movement, the flexible connections throughout will move as a unit.

In the form of the invention shown in Figs. 1 and 2, the expansible and contractible mechanism consists of expansion springs 26 and 27, the opposite ends of which are connected with a link intermediate the ends of the end sections 22 and 23 and at the opposite ends of the intermediate section 24. To limit the amount of expansion of such springs 26 and 27, I provide a length of chain 28 extending from the point of connection of a spring 26 or 27 with the adjacent end section of the flexible connection, to one end of the intermediate section 24 of the flexible connection. This length of chain 28 is sufficiently great so that when either spring 26 or 27 is contracted, slack will be formed between the end section and the intermediate section amounting to one-half the maximum stroke of a foot lever. In expanding said springs, however, the extent of this expansion is limited by the length of chain in the slack section 28, and when this limit is reached, there is a continuous, non-expansible, flexible connection between the two foot levers 19 and 20. The use of this means defining the amount of expansion of a spring 26 or 27 or an equivalent elastic member is essential to the proper operation of the propelling mechanism of the vehicle, and places a limitation upon the amount of forward oscillation of either lever 19 or 20.

The side flange of each channel member 10 or 11 is provided with a stop member 29 with which the adjacent lever 19 or 20 engages when it is brought to its uppermost position. This is best shown in Fig. 1 of the drawing.

Carried by each channel member 10 and 11 is a guide sheave 30 positioned below the sprocket wheel 16 of the adjacent one-way clutch mechanism, the end length of flexible connection 22 or 23, in its run in developing propelling power in the driving wheel, passing downwardly and about said sheave, and upwardly into engagement with the sprocket wheel.

Pivotally connected with the steering head cap 14 of the front frame by means of a pivot pin 31 having a vertical axis, is a rear frame 32 having mounted therein a wheel 33. Adjustably mounted upon this frame in any desired manner is an ordinary saddle 34.

In the embodiment of the invention shown in Fig. 3, the construction is identical with that shown in Figs. 1 and 2, with the exception that instead of using expansion springs 26 and 27, the elastic member consists of a heavy elastic rubber band 35 extending between the end of the end section 22 or 23 and the adjacent intermediate section 24 of the flexible connection between the foot levers.

In some respects, an elastic band is preferable to a coiled expansion spring, since such a band has been found to have a life of many months and may be readily obtained and replaced in the event of breakage. No great strength is required in this elastic member since it is not designed to transmit any power but merely to permit elongation of the flexible connection and take up slack therein as rapidly as it may be developed because of the sudden release of either pedal or a loss in accuracy in the timing of the two pedals.

Power is transmitted through the one-way clutch mechanism solely by the movement of the end portion 22 or 23 of the flexible connections, and if these pedals are accurately timed in their movement in opposite directions, the flexible connection between the two levers will be continuous and unyielding.

As will more fully appear hereinafter, under ideal working conditions the elastic members 26, 27 and 35 will always be under the maximum tension in a condition to take up slack adjacent the sprocket wheels 16 or adjacent the sheave 25 immediately that it is developed, and to transfer this slack to the section 28 in the connection between the intermediate section 24 and the end sections 22 and 23 of said flexible connection.

In the embodiment of the invention shown in Fig. 4, a reversal of parts and operation, as compared with the embodiment of the invention shown in Figs. 2 and 3, is shown. In this embodiment of the invention, the expansible and contractible member consists of a housing 36 connected at one end with the intermediate section 24 of the flexible connections, and having mounted therein a plunger rod 37 having an enlarged head 38 between which and the bottom of the housing 36 is a compression spring 39. The free end of the plunger 37 is connected with an end section 22 or 23 of the flexible connection.

Instead of using a short section of chain for limiting the amount of elongation of the flexible connections, I provide an elongated stem 40 carried by the plunger 37 adjacent the head 38 which, by engagement with the bottom of the housing 36, will limit the amount of compression of the spring 39. The mechanism shown in Fig. 4 is used in lieu of the elastic members 26, 27 or 35 and the short length of chain 28 forming slack across this elastic member. While such a short length of chain might be used in connection with a compression spring, it is unnecessary and hence may be dispensed with.

The channel members 10 and 11 and the steering head cap 14 may be made either of pressed metal or a cast light metal, such as aluminum. The rear frame 32 may be made of sheet metal, drawn to form, or cast aluminum, the same as the channel members. The pivot 31 is connected with the rear frame 32 by means of a cast metal fitting 41 secured to the rear frame member by riveting, spot welding or in any other desired manner.

Each of the footlevers 19 and 20 is provided with a sequence of openings spaced at different radial distances from the point of pivotal support of said levers, these openings being shown at 42 in the drawing. By means of these openings, the end sections 22 and 23 of the flexible connection between the two levers may be adjusted lengthwise of said levers so as to vary the length of the oscillatory movement of the lever according to the requirements of a particular rider.

Mudguard sections 43 may be formed integrally with, or secured to the channel members 10 and 11. The construction of the rear frame 32 is such as to include therein integral mudguard features.

By using channel members 10 and 11, the one-way clutch mechanisms, the guide sheave 30 and the flexible connections are housed in upon three sides thereof, ample clearance being afforded between the tops of the flanges of said channel members and the wheels to prevent any interference. This will appear from Fig. 2 of the drawing.

The operation of the herein described vehicle is substantially as follows:—

In the embodiment of the invention shown in the drawing, assuming that a twenty-eight inch wheel be used (but the size of the wheel is immaterial) the seat 34 will be a trifle over two feet from the ground. The seat 34 is positioned well rearwardly of the shaft 12 so as to afford ample room for a full forward thrust of the leg in propelling the vehicle.

The springs 26 and 27, or equivalent elastic members will normally draw both of said levers upwardly into contact with the stops 29 by shortening the total length of the flexible connection. If sections 28 be used as in Figs. 1 to 3 slack will be developed in said sections corresponding in amount with the decreased length of the connections as a whole.

When applying power to a vehicle, the rider thrusts one lever, as 20, downwardly and forwardly of the machine, thus moving the end section 22 of the chain causing the rotation of the sprocket wheels 16 and the ratchet wheel 17 through the pawl 18, and turning the driving wheel 13 in a manner to advance the vehicle.

During the initial movement of the end section 22 of the flexible connection, the spring 26 will expand until its tension exceeds that of the tension of the spring 27, whereupon said spring will also expand and the intermediate section 24 of the flexible connection will have movement about the sheave 25. While the lever movement will be a rapid movement, there will be a constant variation in the action of the two springs 26 and 27 and of the section 24 until both springs have been expanded to their maximum as defined by the taking up of slack in the section 28.

Assuming that an eight inch stroke is required of the levers 19 and 20, the amount of expansion of each spring 26—27 will be four inches, so that when one lever has reached the limit of its stroke its movement will be automatically arrested by the engagement of the other lever with the stop 29 and a non-expansible connection between the two levers.

While I have referred to an eight inch stroke of the levers this stroke may be varied by adjusting the end sections toward or from the axis of pivotal movement of the levers by means of the openings 42, so that the run of the end sections 22 and 23 may be maintained at eight inches by a greater or less movement of the levers. When the lever comes to rest, the driving wheel will continue to turn in a contra-clockwise movement, as shown in Fig. 1, and power may be applied to the wheel by the other lever 19 by pressing it downwardly and forwardly while at the same time permitting the other lever 20 to move toward its stop 29.

When the lever 20 has reached the limit of its stroke, both springs 26 and 27 will be under tension, and if the lever is released, it will be immediately restored by the contraction of these springs to its position in engagement with its stop 29. If the lever 19 is moved downwardly and outwardly at a lower speed than the return movement of the lever 20 toward the front frame, the springs 26 and 27 will immediately contract to an extent to take up any slack thus formed in the flexible connection.

These springs 26 and 27 have no function in the actual development of power applied to the driving wheel. They will resist the movement of either lever in a manner to induce a uniform pressure on the lever by the rider; exert a constant tendency to restore either lever to its normal position in engagement with its stop 29 immediately that the pressure on said lever is released, and instantly take up any slack formed in the chain and concentrate this slack in the section 28 of the flexible connection. If both levers are accurately timed in their movement in opposite directions, both springs 26 and 27 will remain expanded to their full extent so long as this condition continues, but the minute there is any variation in this timing, either or both springs will act to prevent the creation of slack, except in the section 28 of the flexible connection.

The only portions of the chain operative in developing power are the end sections 22 and 23, all other sections of the chain being merely for the purpose of so connecting the two levers 19 and 20 as to permit one, during its power stroke, to assist the return movement of the leg of the rider, thus aiding in securing an approximate timing in the stroke of the two levers, in assisting the rider to maintain his balance while using the vehicle, and to permit the desired run of the portions of the flexible connection operative upon the clutch mechanisms with a length of flexible connection made necessary by the limited space available.

In the form of the invention shown in Fig. 4, the elongation and shortening of the chain results by the compression of the spring 39 instead of by the expansion of the springs of the elastic members as called for in the other forms of the invention shown.

In all forms of the invention, the flexible connection is elongated against spring tension to permit the application of power to the driving wheel, and during and following such application of power, the springs are always so tensioned as to have a tendency to shorten the flexible connection and impart a return movement to either foot lever. The springs resist movement of the foot levers while power is being applied to the wheel, and by reason of the use of these springs, both foot levers will be engaged with their stops 29 when they are relieved of restraining pressure.

In the forms of the invention shown, the amount of elongation of the flexible connection is limited by means controlling the amount of expansion or contraction of the springs or other elastic members, either by sections 28 as shown in Figs. 1 to 3, or by stop members 40 as shown in Fig. 4.

In all forms of the invention shown, the flexible connection is guided in its run by the sheaves 25 and 30, the latter sheave ensuring a run of the end sections of the flexible connection in relation to their co-operating sprocket wheels to ensure the turning of the driving wheel in the proper direction.

It is not my intention to limit the invention to the precise details of construction shown in the accompanying drawing, it being obvious that such may be varied without departing from the spirit and scope of the invention.

Having described the invention, what I claim as new and desire to have protected by Letters Patent, is:—

1. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, a flexible connection having its opposite ends connected with said levers; and expansible and contractible means in the length thereof permitting elongation and shortening of said flexible connection, means limiting the amount of expansion and contraction of said means, guides for said flexible connection carried by said front frame, and one-way clutch mehanisms carried by said front frame, operative upon said driving wheel and actuated by said flexible connection, whereby the portion of said flexible connection between said expansible and contractible means and said lever may impart turning movement to said driving wheel independently of movement of other parts of said flexible connection.

2. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, one-way clutch mechanisms carried by said front frame operative upon said driving wheel, an idler sheave adjacent the top of said front frame, idler sheaves below said one-way clutch mechanisms, a flexible connection having its opposite ends connected with said levers and passing about said idler sheaves respectively, expansible and contractible means in said connection intermediate said first named sheave and each of said other named sheaves, said means permitting elongation and shortening of said flexible connection, whereby the portion of said flexible connection between said expansible and contractible means and said levers respectively may impart turning movement to said driving wheel independently of movement of other parts of said flexible connection, and means limiting the amount of expansion and contraction of said means.

3. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, a flexible connection having its opposite ends connected with said levers, and expansible and contractible means in the length thereof having a normal tendency to engage said levers with said stops and permit elongation and shortening of said flexible connection, means limiting the amount of expansion and contraction of said means, guides for said flexible connection carried by said front frame, and one-way clutch mechanisms carried by said front frame, operative upon said driving wheel and actuated by said flexible connection, whereby the portion of said flexible connection between said expensible and contractible means and said lever may impart turning movement to said driving wheel independently of movement of other parts of said flexible connection.

4. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, a flexible connection having its opposite ends connected with said levers, means permitting adjustment of the point of connection of said flexible connection radially of said levers respectively, and expansible and contractible means in the length thereof permitting elongation and shortening of said flexible connection, means limiting the amount of expansion and contraction of said means, guides for said flexible connection carried by said front frame, and one-way clutch mechanisms carried by said front frame, operative upon said driving wheel and actuated by said flexible connection, whereby the portion of said flexible connection between said expansible and contractible means and said lever may impart turning movement to said driving wheel independently of movement of other parts of said flexible connection.

5. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, one-way clutch mechanisms carried by said front frame operative upon said driving wheel, an idler sheave adjacent the top of said front frame, idler sheaves below said one-way clutch mechanisms, a flexible connection having its opposite ends connected with said levers and passing about said idler sheaves respectively, expansible and contractible means in said connection intermediate said first named sheave and each of said other named sheaves having a normal tendency to engage said levers with said stops and permitting elongation and shortening of said flexible connection, whereby the portion of said flexible connection between said expansible and contractible means and said levers respectively may impart turning movement to said driving wheel independently of movement of other parts of said flexible connection, and means limiting the amount of expansion and contraction of said means.

6. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, a flexible connection having its opposite ends connected with said levers, and expansible and contractible means in the length thereof permitting elongation and shortening of said flexible connection, means limiting the amount of expansion and contraction of said means, guides for said flexible connection carried by said front frame, and one-way clutch mechanisms carried by said front frame, operative upon said driving wheel and actuated by said flexible connection, whereby the portion of said flexible connection between said expansible and contractible means and said lever may impart turning movement to said driving wheel indpendently of movement of other parts of said flexible connection, said front frame comprising two channel members housing said means for applying power to said driving wheel, and a steering head cap inclosing the upper part of said channel members, the lower portion of said members being connected by a shaft upon which said driving wheel and said one-way clutch mechanisms are mounted 7. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, a flexible connection having its opposite ends connected with said levers, an expansion spring in the length thereof having a normal tendency to engage said levers with said stops and permit elongation and shortening of said flexible connection, means limiting the amount of expansion and contraction of said spring, guides for said flexible connection carried by said front frame, and one-way clutch mechanisms carried by said front frame, operative upon said driving wheel and actuated by said flexible connection, whereby the portion of said flexible connection between said expansion spring and said lever may impart turning movement to said driving wheel independently of movement of other parts of said flexible connection.

8. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, one-way clutch mechanisms carried by said front frame operative upon said driving wheel, an idler sheave adjacent the top of said front frame, idler sheaves below said one-way clutch mechanisms, a flexible connection having its opposite ends connected with said levers and passing about said idler sheaves respectively, expansion springs in said connection intermediate said first named sheave and each of said other named sheaves respectively having a normal tendency to engage said levers with said stops and permitting elongation and shortening of said flexible connection, whereby the portion of said flexible connection between said expansion springs and said levers respectively may impart turning movement to said driving wheel independently of movement of other parts of said flexible connection, and means limiting the amount of expansion and contraction of said springs.

9. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, a flexible connection having its opposite ends connected with said levers, an expansion spring in the length thereof having a normal tendency to engage said levers with said stops and permit elongation and shortening of said flexible connection, a short length of said flexible connection extending between the opposite ends of said spring, whereby the amount of expansion thereof is limited, guides for said flexible connection carried by said front frame, and one-way clutch mechanisms carried by said front frame, operative upon said driving wheel and actuated by said flexible connection, whereby the portion of said flexible connection between said expansion spring and said lever may impart turning movement to said driving wheel independently of movement of other parts of said flexible connection.

10. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, one-way clutch mechanisms carried by said front frame operative upon said driving wheel, an idler sheave adjacent the top of said front frame, idler sheaves below said one-way clutch mechanisms, a flexible connection having its opposite ends connected with said levers and passing about said idler sheaves respectively, elastic rubber bands in said connection intermediate said first named sheave and each of said other named sheaves respectively having a normal tendency to engage said levers with said stops and permitting elongation and shortening of said flexible connection, whereby the portion of said flexible connection between said elastic rubber bands and said levers respectively may impart turning movement to said driving wheel independently of movement of other parts of said flexible connection, and means limiting the amount of expansion and contraction of said bands.

11. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, a flexible connection having its opposite ends connected with said levers, an elastic rubber band in the length thereof having a normal tendency to engage said levers with said stops and permit elongation and shortening of said flexible connection, a short length of said flexible connection extending between the opposite ends of said band, whereby the amount of expansion thereof is limited, guides for said flexible connection carried by said front frame, and one-way clutch mechanisms carried by said front frame, operative upon said driving wheel and actuated by said flexible connection, whereby the portion of said flexible connection between said elastic rubber band and said lever may impart turning movement to said driving wheel independently of movement of other parts of said flexible connection.

12. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, a flexible connection having end sprocket chain sections connected with said levers, an intermediate section, a housing connected to said intermediate section, a plunger within said housing, one end of which is connected with an end section, a compression spring between said plunger and the housing adjacent said end section, means limiting the amount of compression of said spring, guides for said flexible connection carried by said front frame, and one-way clutch mechanisms carried by said front frame operative upon said driving wheel and actuated by the end sections of said flexible connection, whereby the portion of said flexible connection between said plunger and said lever may impart turning movement to said wheel independently of movement of other parts of said flexible connection.

13. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, one-way clutch mechanisms carried by said front frame operative upon said driving wheel, an idler sheave adjacent the top of said front frame, idler sheaves below said one-way clutch mechanisms, a flexible connection having end sprocket chain sections connected with said levers, passing about the idler sheaves adjacent and cooperating with said clutch mechanisms, an intermediate section passing about said other sheave, housings connected to the opposite ends of said intermediate section, a plunger within each said housing, one end of which is connected with an end section, compression springs between said plungers and the housings adjacent said end sections, and means limiting the amount of compression of said springs, said springs having a normal tendency to engage said levers with said stops and permitting elongation and shortening of said flexible connection, whereby the end sections of said flexible connection between said plungers and said levers respectively may impart turning movement to said driving wheel independently of movement of other parts of said flexible connection.

14. A vehicle embodying therein a front frame, a rear frame pivotally connected therewith, a driving wheel mounted in said front frame, a wheel mounted in said rear frame, and means applying power to said driving wheel comprising oscillatory levers mounted in said front frame, stops upon said front frame engageable by said levers respectively, one-way clutch mechanisms carried by said front frame operative upon said driving wheel, an idler sheave adjacent the top of said front frame, idler sheaves below said one-way clutch mechanisms, a flexible connection having end sprocket chain sections connected with said levers, passing about the idler sheaves adjacent and cooperating with said clutch mechanisms, an intermediate section passing about said other sheave, housings connected to the opposite ends of said intermediate section, a plunger within each said housing, one end of which is connected with an end section, compression springs between said plungers and the housings adjacent said end sections, and an elongated stem carried by each said plunger and engageable with the bottom of each said housing, whereby the amount of compression of said springs is limited, said springs having a normal tendency to engage said levers with said stops and permitting elongation and shortening of said flexible connection, whereby the end sections of said flexible connection between said plungers and said levers respectively may impart turning movement to said driving wheel independently of movement of other parts of said flexible connection.

RICHARD LABORDA.